(12) United States Patent
Reisdorf et al.

(10) Patent No.: US 7,422,819 B2
(45) Date of Patent: Sep. 9, 2008

(54) CERAMIC COATINGS FOR INSULATING MODULAR FUEL CELL CASSETTES IN A SOLID-OXIDE FUEL CELL STACK

(75) Inventors: Gary F. Reisdorf, Penfield, NY (US); Joseph M. Keller, Grand Blanc, MI (US); Karl J. Haltiner, Jr., Fairport, NY (US); Subhasish Mukerjee, Rochester, NY (US); Kenneth Scott Weil, Richland, WA (US); John S. Hardy, Richland, WA (US)

(73) Assignee: Delphi Technologies, Inc., Troy, MI (US)

( * ) Notice: Subject to any disclaimer, the term of this patent is extended or adjusted under 35 U.S.C. 154(b) by 181 days.

(21) Appl. No.: 11/158,369

(22) Filed: Jun. 22, 2005

(65) Prior Publication Data

US 2007/0134537 A1    Jun. 14, 2007

Related U.S. Application Data

(63) Continuation of application No. 11/027,095, filed on Dec. 30, 2004, now Pat. No. 7,306,872.

(51) Int. Cl.
*H01M 2/08* (2006.01)
(52) U.S. Cl. .................................. 429/35
(58) Field of Classification Search .............. 429/35, 429/32; 427/654
See application file for complete search history.

(56) References Cited

U.S. PATENT DOCUMENTS

| 6,430,966 | B1 | 8/2002 | Meinhardt et al. |
| 2003/0203267 | A1 | 10/2003 | Chou et al. ................ 429/35 |
| 2003/0224238 | A1 | 12/2003 | Finn et al. ................ 429/35 |
| 2004/0060967 | A1 | 4/2004 | Yang et al. ............. 228/122.1 |

FOREIGN PATENT DOCUMENTS

| EP | 1325774 | 7/2003 |
| EP | 1492190 | 12/2004 |

OTHER PUBLICATIONS

European Search Report for EP 05077763.

*Primary Examiner*—Patrick Ryan
*Assistant Examiner*—Thomas H. Parsons
(74) *Attorney, Agent, or Firm*—Paul L. Marshall

(57) ABSTRACT

In assembling an SOFC fuel cell stack from a plurality of cassettes, the mounting plate of one cassette is attached to, and insulated from, the separator plate of the next-adjacent cassette by a peripheral dielectric seal consisting of a ceramic coating and a metal braze. Materials suitable for the ceramic coating include yttrium stabilized zirconia (YSZ), zirconia toughened alumina, magnesium silicates such as the mineral forsterite, magnesium aluminates, magnesium aluminosilicates and lanthanum zirconate. The ceramic coating may be applied to the cassette's outer surface in known fashion as by physical vapor deposition, chemical vapor deposition, sputtering, and various methods of plasma spray. An underlayer of alumina may also be used to provide a redundant layer of electrical insulation.

20 Claims, 6 Drawing Sheets

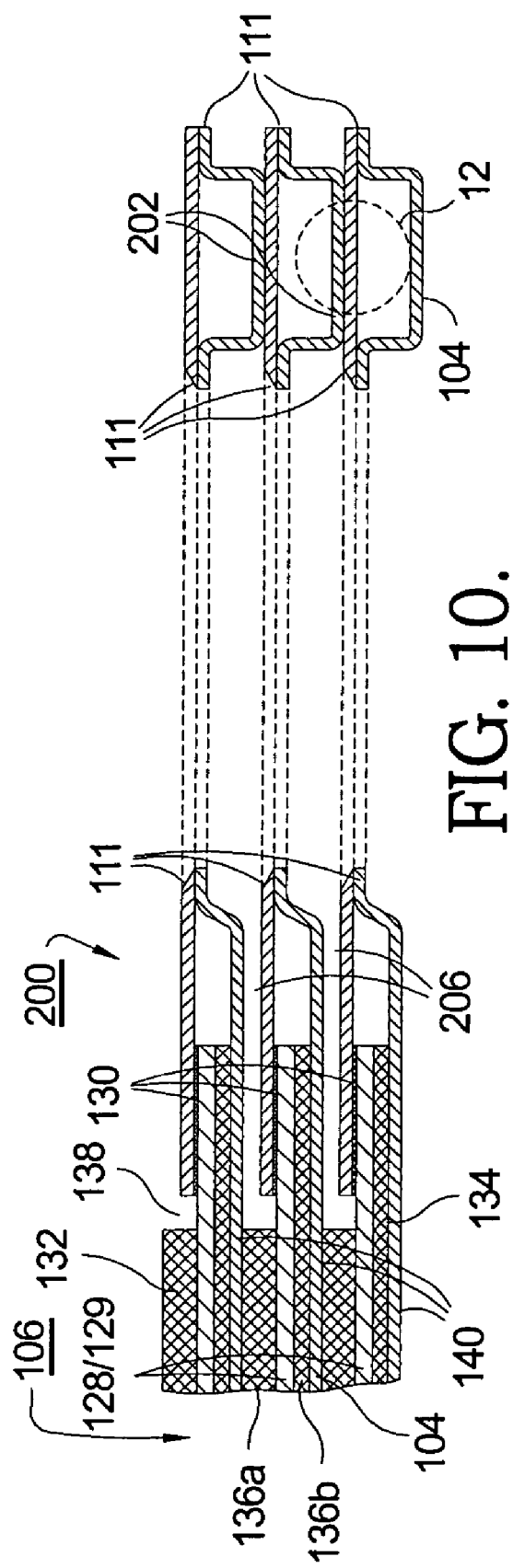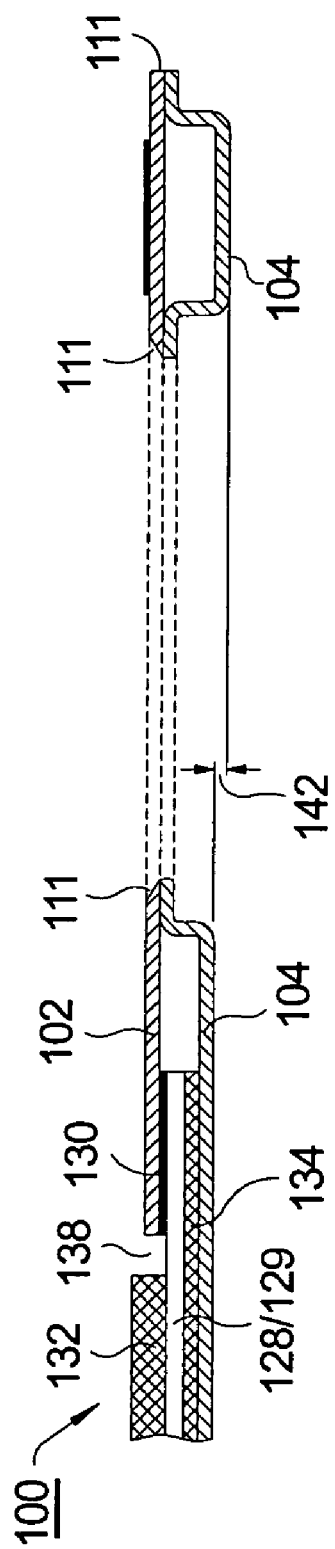
FIG. 10.
FIG. 11.

CERAMIC COATINGS FOR INSULATING MODULAR FUEL CELL CASSETTES IN A SOLID-OXIDE FUEL CELL STACK

RELATIONSHIP TO OTHER APPLICATIONS AND PATENTS

The present application is a Continuation-In-Part of a U.S. patent application Ser. No. 11/027,095, filed Dec. 30, 2004 now U.S. Pat. No. 7,306,872.

This invention was made with United States Government support under Government Contract/Purchase Order No. DE-FC26-02NT41246. The Government has certain rights in this invention.

TECHNICAL FIELD

The present invention relates to fuel cells; more particularly, to solid-oxide fuel cells; and most particularly, to ceramic coatings for forming insulative gaskets between adjacent modular fuel cell cassettes in an SOFC stack.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application, an SOFC is preferably fueled by "reformate" gas, which is the effluent from a catalytic liquid or gaseous hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of 700° C. to 1000° C.

A complete fuel cell stack assembly includes fuel cell assemblies and a plurality of components known in the art as interconnects, which electrically connect the individual fuel cell assemblies in series. Typically, the interconnects include a conductive foam or weave disposed in the fuel gas and air flow spaces adjacent the anodes and cathodes of the assemblies.

A fuel cell unit may be incorporated into a modular fuel cell cassette for use in assembling a fuel cell stack. Such an assembly may comprise a metal separator plate and a metal cell-mounting plate or frame so formed that when they are joined at their perimeter edges to form a housing for the cassette, a cavity is formed between them which can contain a gas stream that feeds a fuel cell unit attached within the cassette to the mounting plate. Outboard of the fuel cell unit, the separator plate and cell-mounting plate are perforated by openings to form chimney-type manifolds for feeding fuel gas to the anode and air to the cathode, and for exhausting the corresponding gases from the stack. The fuel cell unit is attached to, and insulated from, the mounting plate. The mounting plate includes an opening through which one of the electrodes is accessible, preferably the cathode, and through which a conductive interconnect element extends to make contact with the outer surface of the next-adjacent cassette in a stack. The anode openings in the mounting plate and separator plate are separated by spacer rings such that the cassette is incompressible. The rings include openings which allow fuel gas to flow from the anode supply chimney into the anode gas channel in the cassette. For the cathode, the edges of the cathode air openings are formed similar to the perimeter of the cassette so that the edges of the respective openings in the mounting and separator plates are welded together.

In assembling a fuel cell stack from a plurality of cassettes, the mounting plate of one cassette is attached to, and insulated from, the separator plate of the next-adjacent cassette by a peripheral dielectric seal surrounding the interconnect extending from the mounting plate central opening. Thus, each cassette is at the voltage potential of the adjacent cell in a first direction by virtue of contact with its interconnect, and is insulated from the adjacent cell in the opposite direction by virtue of the peripheral dielectric seal. The cassettes are connected in electrical series and the supply and exhaust manifolds are formed inherently by the stack-assembly process.

For forming the dielectric seals between the adjacent cassettes, it is known in the prior art to use various glass and ceramic compositions based on boron, phosphate, and silica, as referenced in U.S. Pat. No. 6,430,966. These glass/ceramic sealants are also useful as dielectric insulators between adjacent cell elements at different voltage potentials. However, these sealants have some known drawbacks.

At operating temperatures, phosphate glasses are too volatile and react with the anode material to form various nickel phosphorous compounds. They also show low stability in humidified fuel gas. Borosilicates are known to react with a humidified hydrogen atmosphere to form the gaseous species $B_2(OH)_2$ at operating temperature, and thus the seal corrodes with time.

Typically, glass seals require high-temperature heat treatment (700° C.-900° C.) during manufacture of a fuel cell system, during which the glass softens and flows to fill the interface between the components and bonds to the surfaces. Upon further heating and increased time, the melt devitrifies to form the final microstructure desired for the application. This seal provides a good insulating joint and a good initial bond joint. The seal functions satisfactorily until the stack assembly undergoes multiple thermal cycles when it becomes prone to crack propagation. Because of localized differences in the coefficients of thermal expansion of the components and the glass seals, and because the glass may be progressively crystallized, the seal may fracture, resulting in gas leakage and failure of the fuel cell stack assembly. As the leak increases progressively, cell output diminishes until the total voltage output is unacceptably low.

A material used in forming dielectric sealing gaskets, known in the prior art and disclosed in U.S. Pat. No. 6,430,966, is a silicate based glass that exhibits high chemical resistance and minimal interaction with other fuel cell materials. A known material for such use is a blend of metal (M) oxides, $M_AO_X + M_BO_Y + SiO_2$, wherein $M_A$ may be barium, strontium, calcium, or a combination thereof and $M_B$ may be aluminum, boron, phosphorus, gallium or lead, or a combination thereof. $M_BO_Y$ modifies the softening temperature of the glass and the combination of $M_AO_X$ and $SiO_2$ offers an improved coefficient of thermal expansion. The material also provides good insulation and a good initial bond joint. However, it is prone to micro-cracking at low temperatures, increased brittleness with time during operation, and loss of bond strength with thermal cycles. Therefore, it can be difficult to maintain an adequate seal during repeated thermal cycling.

Glass seals made of compositions known in the art are also commonly prone to process variation. When fabricated from tape cast film that includes a glass frit and an organic binder, seal space can be difficult to control. This is because, during the initial heating of the SOFC stack, the binder burns out and a significant amount of shrinkage occurs. Depending on the compressive load, time under load, and heating/cooling rates in the application, it is difficult to reproduce the structure of the crystallized glass with each fabricated stack assembly. Further, flow properties of the material are very sensitive to average particle size and particle size distribution of the glass frit which is the precursor powder for the glass joint.

What is needed is a material for sealing and insulating in an SOFC system which is thermally stable over the range between shutdown and operating temperatures for both the reformer and the fuel cell assembly; which is chemically stable in oxidizing and reducing environments; which is acceptably rugged for assembly and operation of the system; which can provide a dielectric function; which matches the coefficient of thermal expansion of stainless steel elements in the fuel cell assembly; and which is compatible with other materials of the system.

It is a principal object of the present invention to hermetically seal and electrically insulate joints between adjacent cassettes in a fuel cell assembly.

SUMMARY OF THE INVENTION

Briefly described, a modular fuel cell cassette for use in assembling a fuel cell stack is a sheet metal assembly, preferably formed from a stainless steel such as Crofer 22, comprising a metal separator plate and a metal cell-mounting plate so formed that when they are joined at their perimeter edges to form the cassette, a cavity is formed between them which can contain a gas stream that feeds a fuel cell unit attached within the cassette to the mounting plate. The mounting plate includes an opening through which one of the electrodes is accessible, preferably the cathode, and through which a conductive interconnect element makes contact with the cathode and with the outer surface of the next-adjacent cassette in a stack.

In assembling a fuel cell stack from a plurality of cassettes, the mounting plate of one cassette is attached to, and insulated from, the separator plate of the next-adjacent cassette by a peripheral dielectric seal surrounding the interconnect extending from the mounting plate central opening. The cassettes are connected in electrical series and each cassette is at the voltage potential of the adjacent cell in a first direction by virtue of contact with its interconnect. Each cassette is insulated from the adjacent cassette in both directions by virtue of the peripheral dielectric seal.

The peripheral dielectric seal is formed by first applying to at least one of the mating surfaces of adjacent cassettes a ceramic coating such as, for example, from the group consisting of yttria stabilized zirconia, zirconia toughened alumina, magnesium silicates, magnesium aluminates, magnesium aluminosilicates and lanthanum zirconate. The lanthanum zirconate may be doped with a rare earth element selected from the group consisting of niobium, europium, gadolinium, and combinations thereof. The yttria stabilized zirconia may be doped with aluminum oxide at a volume fraction of up to 65%. The ceramic coating may be applied to the cassette surfaces by a method selected from the group consisting of physical vapor deposition, chemical vapor deposition, sputtering, and plasma spray. After the ceramic coating has been applied, the cassettes are then bonded together using a metal braze, as known in the art, in the areas where the coating had been applied and where the metal separator plate of one cassette contacts the metal mounting plate of the adjacent cassette.

Preferably, prior to the application of the ceramic coating, a layer of aluminum is applied to one or more of the mating surfaces, then heated in a vacuum to force the aluminum to defuse into the surfaces of the plates. During the diffusion process or subsequent heating operations, a thin film of alumina is formed on the surface. The ceramic coating is then applied over the aluminized surface. The alumina layer acts as a redundant electrical insulator in conjunction with the ceramic coating, should the ceramic coating become scratched or porous. In addition, the alumina film enhances the adhesion of the ceramic coating.

BRIEF DESCRIPTION OF THE DRAWINGS

The present invention will now be described, by way of example, with reference to the accompanying drawings, in which:

FIG. 10 is a cross-sectional view taken in circle 10 in FIG. 4;

FIG. 11 is a cross-sectional view of a portion of a cassette taken through a cathode air exhaust opening;

DESCRIPTION OF THE PREFERRED EMBODIMENTS

Figure 1:
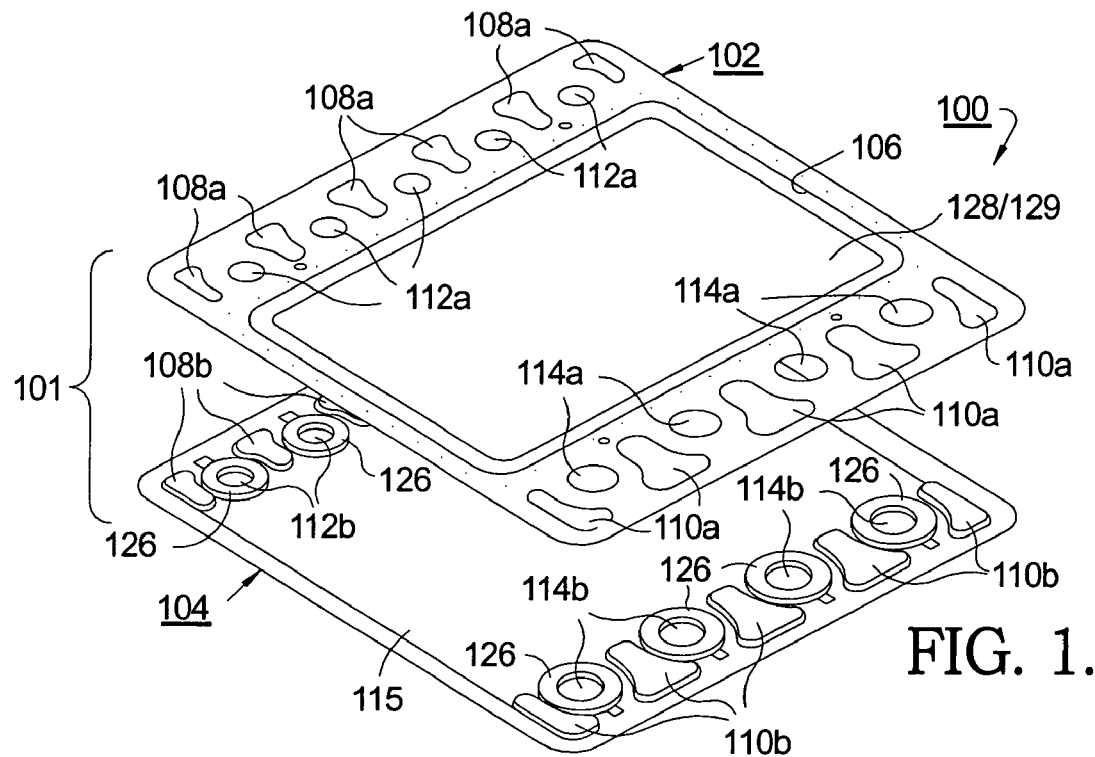
FIG. 1 is an exploded isometric view of a fuel cell cassette in accordance with the invention.
Figure 2:
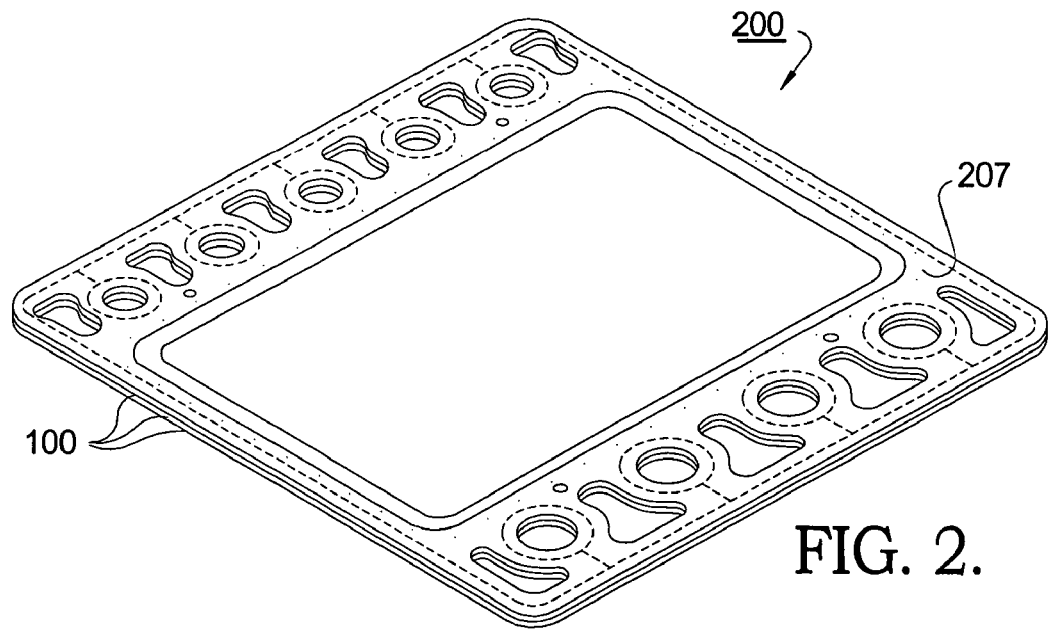
FIG. 2 is an isometric view of a fuel cell stack comprising three cassettes as shown in FIG. 1.
Figure 3:
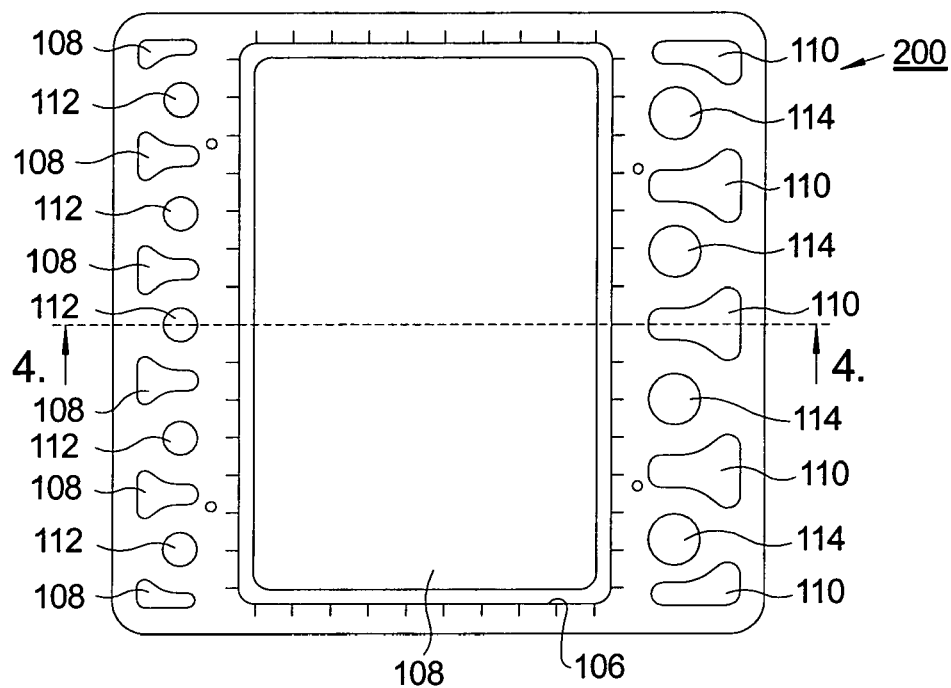
FIG. 3 is a plan view of the fuel cell stack shown in FIG. 2.
Figure 4:
FIG. 4 is a cross-sectional view taken along line 4-4 in FIG. 3.
Figure 5:
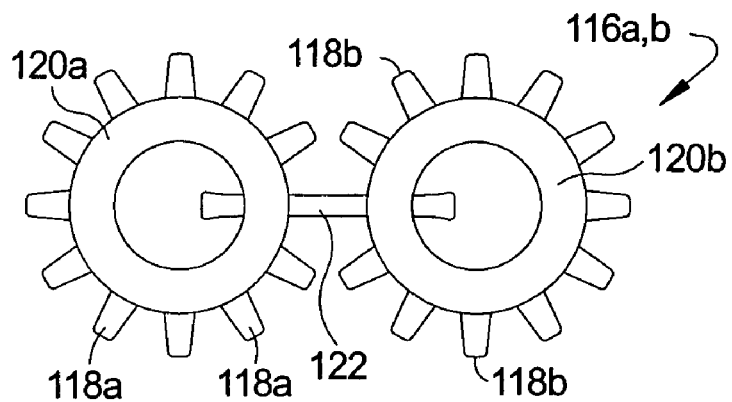
FIG. 5 is a plan view of a separator ring.
Figure 6:
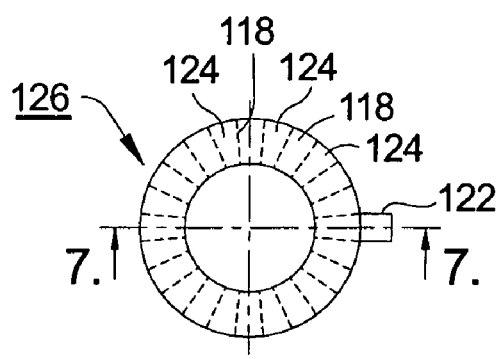
FIG. 6 is a plan view of the separator ring shown in FIG. 5, folded for use in a fuel cell cassette as shown in FIG. 1.
Figure 7:
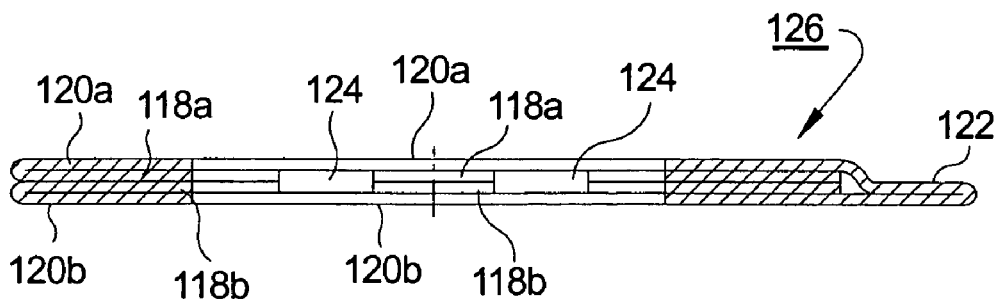
FIG. 7 is a cross-sectional view taken along line 7-7 in FIG. 6.

Referring to FIG. 1, a fuel cell cassette 100 in accordance with the invention includes a cassette housing 101 including a fuel cell mounting plate 102 and a separator plate 104. Mounting plate 102 includes a large central electrode opening 106 for receiving a fuel cell subassembly 128 as described below. Outboard of central electrode opening 106 are cathode air inlets 108*a*, cathode air outlets 110*a*, fuel gas inlets 112*a*, and fuel gas outlets 114*a*. Separator plate 104 is provided with similar and mating air and fuel openings 108*b*, 110*b*, 112*b*, and 114*b*, respectively. Separator plate 104 is formed as a shallow tray 115 such that a cavity is created between plates 102,104 for receiving fuel cell components and fuel gas as described below. Preferably, the mounting and separator plates are formed as by stamping or drawing from thin sheet stock (0.1 to 1.0 mm) of a ferritic stainless steel, such as Crofer 22, although other materials such as austenitic stainless steel or high temperature alloys may also be acceptable. During assembly, plates 102, 104 are joined to define a cassette housing (FIG. 11) by formation of a metallurgical bond 111 at their edges and around each of the air inlets and outlets (FIGS. 8-11) such that only openings 112, 114 have access to the interior of the cassette.

Referring to FIGS. 1 and 3-7, a spacer ring 126 is provided within the cassette for each fuel gas inlet 112*a, b* and each fuel gas outlet 114*a, b*. In a currently preferred embodiment for forming ring 126, a pair of rings 116*a, b* having radial tabs 118 extending from rings 120*a, b* are connected by a link 122. Radial tabs 118 are folded inward and line up with one another when the two rings 120*a*, 120*b* are folded over at link 122 to form solid columns of metal. The spaces between the tabs form openings 124 which allow fuel gas to flow from the fuel gas inlets 112 into the anode gas channel (space contained within the cassette), and into the fuel gas outlets 114 from the anode gas channel. The folded rings 126 form solid metal spacers between mounting plate 102 and separator plate 104, thus defining and maintaining a constant spacing therebetween despite assembly and operational loads on the cassette. Preferably, rings 126 are formed by stamping from sheet materials similar to those disclosed for forming the mounting plate and separator plate.

Figure 8:
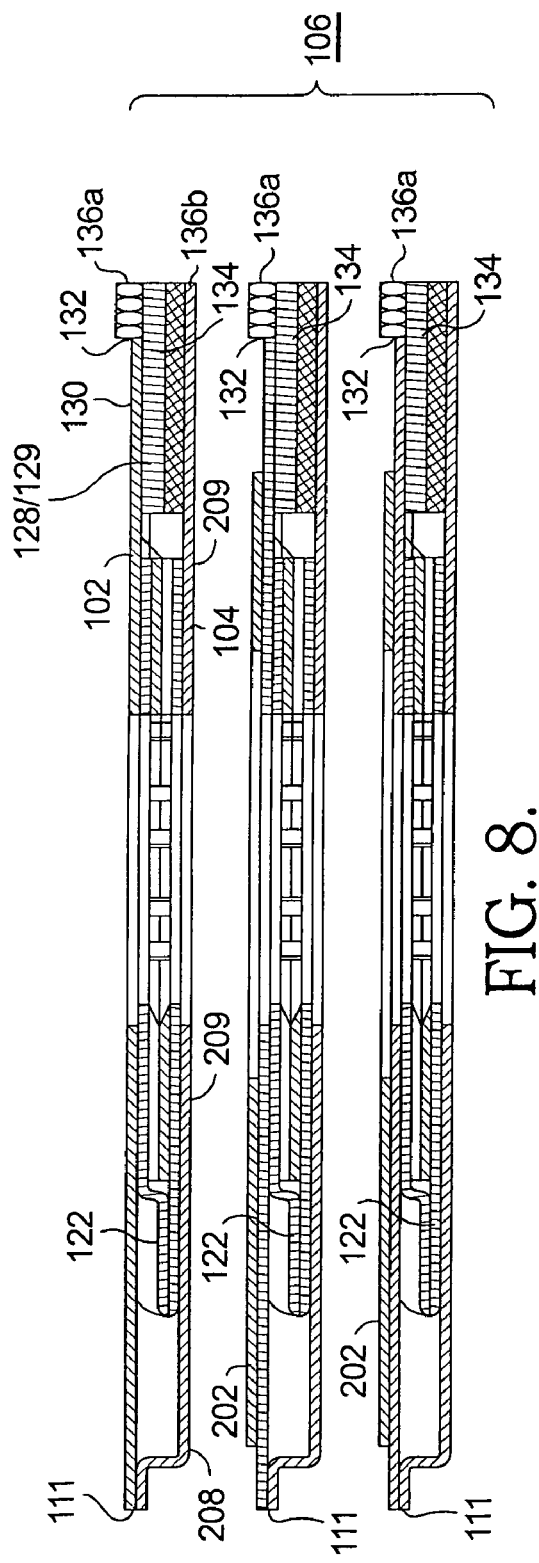
FIG. 8 is an exploded cross-sectional view of a portion of a fuel cell stack as shown in FIG. 9.

Referring to FIGS. 1, 8, and 11, an anode-supported fuel cell subassembly 128 is a three-layer structure comprising a structural anode, a ceramic electrolyte, and a cathode. The anode and cathode are also referred to herein generically as electrodes 129. Such a fuel cell subassembly is well known in the art of solid oxide fuel cells. To assemble assembly 128 to mounting plate 102, the cathode material is stripped or omitted (such as by screen printing) from the borders of subassembly 128, the exposed ceramic electrolyte surface of which is then thermally bonded to mounting plate 102 via a dielectric seal 130 formed by brazing, a ceramic adhesive seal, or, preferably, glass. Thus, subassembly 128 is oriented such that the cathode surface 132 is exposed through central opening 106 and the anode surface 134 faces inwardly of the cassette housing. Further, the cathode electrode of subassembly 128 is thus electrically insulated from mounting plate 102.

The ceramic fuel cell subassembly 128 is preferably mounted to the mounting plate prior to cassette assembly although it can be done during the assembly process if desired.

Figure 9:
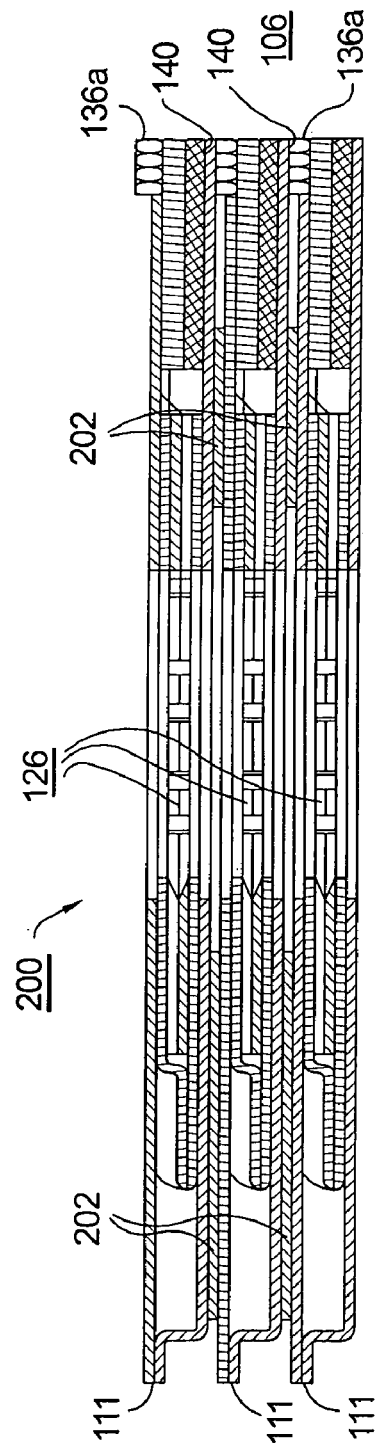
FIG. 9 is a cross-sectional view taken in circle 9 in FIG. 4.

Referring to FIGS. 9 and 10, the spaces adjacent to cathode surface 132 and anode surface 134 serve two distinct functions: to allow passage of the appropriate reactive gases along the electrode surfaces, and to transmit electric current to and from the cell in known fashion. Each such space is filled with a conductive interconnect 136 that is porous or has passages formed into it to allow gas flow. Alternatively, an interconnect may have features formed into it, such as dimples or ribs, to make electrical contact. In a currently preferred embodiment, a metal mesh or foam interconnect 136 (cathode interconnect 136*a* and anode interconnect 136*b*) permits passage of gases along the electrodes and conducts current into and out of the cassette. Because of the corrosive nature of wet reformate on ferritic stainless steels at high temperatures, preferred materials for the interconnects are nickel mesh, a super-ferritic alloy such as Crofer 22 APU or a nickel-based superalloy such as Haynes 230 alloy. Note that cathode interconnect 136*a* is separated by a gap 138 from contact with mounting plate 102.

To complete the assembly of an individual cassette 100, rings 126 are positioned over anode inlet and exhaust openings 112*b*, 114*b* as shown in FIG. 1, interconnect 136*b* is positioned on separator plate 104, and mounting plate 102 bearing fuel cell element 128 is aligned with and placed over separator plate 104. The two plates 102, 104 are then metallurgically joined as by welding or brazing to form joints 111 as described above. The edges of the "keyhole" shaped cathode inlet and exhaust openings 108, 110 are formed similar to the perimeter of the cassette so that those edges are also laser welded together. This prevents cathode air from entering the anode gas channel (interior of the cassette), or anode gas leaking into the cathode air chimney/manifold.

Within the scope of the invention, the fuel cell subassembly may be oriented with either the cathode surface or the anode surface exposed through opening 106 in mounting plate 102. However, the currently preferred assembly configuration has the anode fuel gas stream and fuel cell subassembly 128 contained within the cassette, as shown in FIGS. 10-11. With this approach, the metallurgical bond joint 111 at the perimeter edges of the cassette and the seal 130 between the fuel cell element and the mounting plate are the critical sealing joints for containing the combustible fuel gas within the cassette and stack, which can be leak tested at room temperature before final assembly of the fuel cell stack. This approach significantly improves the quality of the stack manufacturing process and reliability of the stack assembly.

Note that the anode and cathode inlet and exhaust openings in the cassette can be arranged around the fuel cell subassembly in any one of three distinct configurations, only one of which is shown. The most common prior art configuration results in cross flow between the fuel gas direction across the anode and the air direction across the cathode. This is accomplished by arranging the cathode inlet and exhaust openings on two opposite edges of a rectangular cassette, and the anode inlet and exhaust openings on opposing edges adjacent to the edges occupied by the cathode openings. The two other basic configurations are co-flow and counter-flow. In the co-flow configuration (FIG. 1), the anode and cathode flows are parallel and in the same direction. In the counter-flow case, the flows are parallel but in opposite directions. The currently preferred design is co-flow, which has been demonstrated by computer modeling to have the best temperature and current distribution across the fuel cell element.

Referring to FIGS. 2-4, 9 and 10, a fuel cell stack 200 is formed by stacking together a plurality of individual fuel cell cassettes 100. The cassettes are bonded together outboard of central opening 106 in a pattern surrounding the air and fuel gas inlets and exhausts, generally shown as 207 in FIG. 2, using a fusible peripheral seal joint 202. The seal joint also serves as a dielectric isolator of the individual cassettes, as described further below. Thus each cassette in the stack is at the potential of its anode, which is grounded to the separator plate and hence the mounting plate, plus whatever voltage is transferred from prior cassettes in the stack. The total voltage of the stack at any cassette is transferred to the next cassette via the cathode interconnect 136*a* which makes full contact with the outer surface 140 of the separator plate of the next cassette. The stack is terminated at opposite ends by conventional interconnect/terminals (not shown).

Referring to FIGS. 10-11, it is seen that each separator plate 104 is drawn to two depths differing by a distance 142 so that when two cassettes are joined (mounting plate of one cassette to the separator plate of another cassette), a cavity is formed between them which provides an opening 206 for air to enter the cathode interconnect 136*a* and spread across cathode surface 132. Thus, the cathode air channel is the space formed between the cassettes.

The separator plate is formed so that there is a flat ridge coinciding with pattern 207 formed around the perimeter 208 of the separator plate that is on the same plane as the anode opening seal areas 209 (FIG. 8). Bonded joint seal 202 bonds/seals to the separator plate along this ridge and to the mounting plate surface 204 of the adjoining cassette. Therefore one cassette is sealed to the next cassette around the perimeter creating the cathode air channel and preventing cathode air from leaking out of the stack assembly. When the cassettes are stacked together, the cathode openings in the individual cassettes line up to form chimney-type manifolds for cathode air supply and return. Preferably, joint seal 202 does not require a compressive load for sealing and electrically insulating and is also a structural joint able to sustain compressive loads. These seals prevent anode gas in the anode gas chimney/manifolds (supply and return) from leaking into the cathode air channel (or vice-versa). In the preferred arrangement shown herein, the anode inlet and exhaust openings are round and are surrounded by a large flat surface, thereby reducing stress on the seal joint 202, and the large flat surfaces maximize the bond area. The result is a highly reliable and robust sealing joint for the passage of fuel gas from one cassette to the next. The preferred assembly has the cathode air contained in the sealed space between the cassettes.

Figure 12:
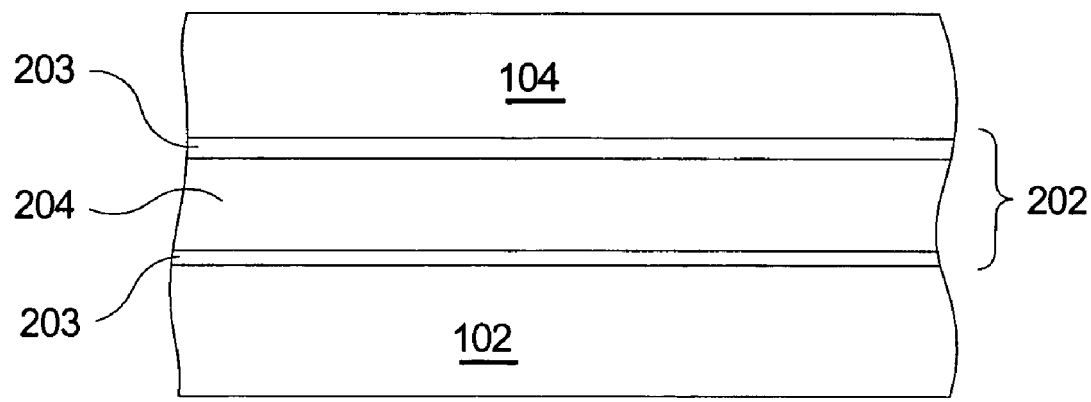
FIG. 12 is a cross-sectional view of the seal joint, in accordance with the invention, taken in circle 12 in FIG. 10.

Referring to FIGS. 10 through 12, fusible peripheral seal joint 202 is preferably formed by first applying a ceramic material 203 directly to one or both of the mating surfaces of the plates 102, 104 of adjacent cassettes in the appropriate regions. The adjacent cassettes are then bonded together at the mating surfaces using a suitable metal braze 204, as known in the art, to form a continuous flat seal joint 202 thereby forming fuel cell stack 200. Ceramic materials suitable for coating the mating surfaces include, but are not limited to, yttria stabilized zirconia (YSZ), zirconia toughened alumina, magnesium silicates such as the mineral forsterite, magnesium aluminosilicates and magnesium aluminates.

Another suitable material for coating the mating surfaces is lanthanum zirconate, $La_2Zr_2O_7$. By doping YSZ with $La_2O_3$, the pyrochlore structure can be formed consisting of lanthanum zirconate. $La_2Zr_2O_7$ also has a high coefficient of thermal expansion (CTE) and is stable from room temperature to the application temperature of an SOFC stack (approximately 800° C.). $La_2Zr_2O_7$ is less oxygen-transparent and has a much lower conductivity than YSZ due to the existence of stable Frenkel pairs.

If it is desired to increase the CTE of $La_2Zr_2O_7$, other rare earth elements may be incorporated while maintaining the stable pyrochlore structure, for example, neodymium zirconate, europium zirconate, or gadolinium zirconate.

Pure YSZ displays a relatively high ionic conductivity at the operating temperature of an SOFC stack. However, substituting aluminum oxide $Al_2O_3$ at a volume fraction of up to 65% of $ZrO_2$ drastically reduces the ionic conductivity relative to pure YSZ.

The ceramic materials used to coat the plates in accordance with the invention may be applied to the cassette outer surface in known fashion as by physical vapor deposition, chemical vapor deposition, sputtering, and various methods of plasma spray. The ceramic materials may also be formed into a desired shape first by conventional ceramic processing (pressing, extrusion or casting), then sintered to the mating surface(s) before brazing.

Figure 13:
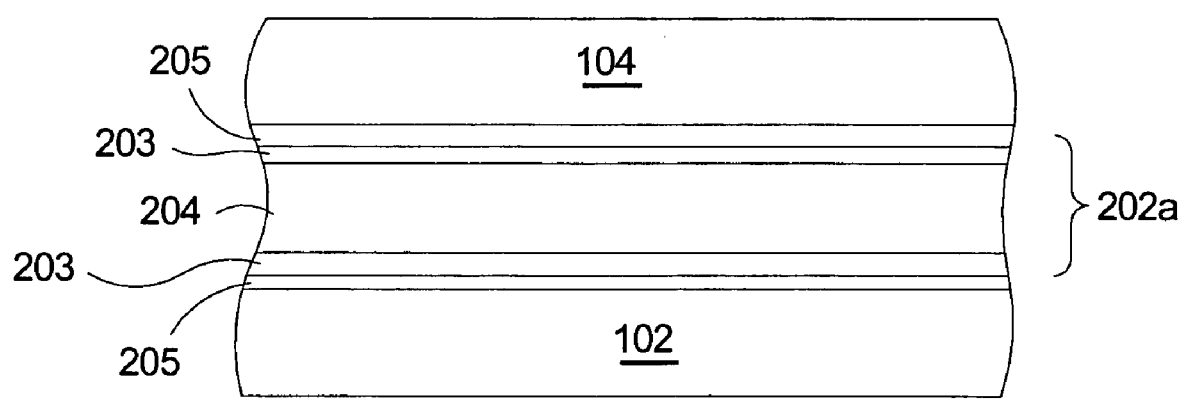
FIG. 13 is a cross-sectional view, similar to the view shown in FIG. 12, of another seal joint in accordance with the invention.

Referring to FIG. 13, to obtain a robust and adequate bond of the ceramic coating to the cassette metal and to provide a redundant layer of electrical insulation, a bonding layer or undercoat may be used. An aluminum undercoat about 3 μm thick can be applied to the metal mating surfaces before the ceramic coating is applied. The aluminum layer is then heated in a vacuum to defuse the aluminum into the surface leaving a layer of alumina 205 on the pre-coated surface of the mating plates. The ceramic coating 203 is then applied on top of the alumina, as described above, and plates 102, 104 bonded together using a suitable metal braze 204 as know in the art. Seal joint 202a provides two layers of insulation to the joint, the alumina being a back-up to the ceramic coating should the coating become porous or scratched.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A seal joint for sealing together and insulating adjacent elements of a solid oxide fuel cell comprising a metal braze layer and a separate ceramic layer applied to at least one of said adjacent elements, wherein material of said ceramic layer is selected at least in part from the group consisting of zirconia toughened alumina, magnesia silicates, magnesium aluminates, and lanthanum zirconate.

2. A seal joint in accordance with claim 1 further comprising a layer of alumina.

3. A seal joint in accordance with claim 1 wherein said elements include a metal interconnect.

4. A seal joint in accordance with claim 3 wherein said metal interconnect is at least a portion of a housing for a fuel cell cassette.

5. A seal joint in accordance with claim 1 wherein said lanthanum zirconate is doped with a rare earth element selected from the group consisting of niobium, europium, gadolinium, and combinations thereof.

6. A seal joint in accordance with claim 1 wherein said group of material of said ceramic layer further includes yttrium stabilized zirconium doped with aluminum oxide at a volume fraction of up to 65%.

7. A solid oxide fuel cell stack comprising a plurality of modular solid oxide fuel cell cassettes joined together by a seal joint including a metal braze layer and a separate ceramic layer applied to a surface of at least one of said fuel cell cassettes, wherein material of said ceramic layer is selected at least in part from the group consisting of zirconia toughened alumina, magnesium silicates, magnesium aluminates, magnesium aluminosilicates and lanthanum zirconate.

8. A fuel cell stack in accordance with claim 7 wherein said lanthanum zirconate is doped with a rare earth element selected from the group consisting of niobium, europium, gadolinium, and combinations thereof.

9. A fuel cell stack in accordance with claim 7 wherein said group of material of said ceramic layer further includes Atrium stabilized zirconium is doped with aluminum oxide at a volume fraction of up to 65%.

10. A fuel cell stack in accordance with claim 7 wherein said ceramic layer is applied to said cassettes by a method selected from the group consisting of physical vapor deposition, chemical vapor deposition, sputtering, and plasma spray.

11. A fuel cell stack In accordance with claim 7 further comprising a layer of alumina on a surface of at least one of said fuel cell cassettes.

12. A seal joint for sealing together and insulating adjacent elements of a solid oxide fuel cell comprising a metal braze layer and a separate ceramic layer applied to at least one of said adjacent elements, wherein material of said ceramic layer is selected at least in part from the group consisting of yttrium stabilized zirconium doped with aluminum oxide at a volume fraction of up to 65%, zirconia toughened alumina, magnesium silicates, magnesium aluminates, magnesium aluminosilicates and lanthanum zirconate.

13. A seal joint in accordance with claim 12 further comprising a layer of alumina.

14. A seal joint in accordance with claim 12 wherein said elements include a metal interconnect.

15. A seal joint in accordance with claim 14 wherein said metal interconnect is at least a portion of a housing for a fuel cell cassette.

16. A solid oxide fuel cell stack comprising a plurality of modular solid oxide fuel cell cassettes joined together by a seal joint including a metal braze layer and a separate ceramic layer applied to a surface of at least one of said fuel cell cassettes, wherein material of said ceramic layer is selected at least in part from the group consisting of yttrium stabilized zirconium doped with aluminum oxide at a volume fraction of up to 65%, zirconia toughened alumina, magnesium silicates, magnesium aluminates, magnesium aluminosilicates and lanthanum zirconate.

17. A fuel cell stack in accordance with claim 16 wherein said ceramic layer is applied to said cassettes by a method selected from the group consisting of physical vapor deposition, chemical vapor deposition, sputtering, and plasma spray.

18. A fuel cell stack in accordance with claim 16 further comprising a layer of alumina on a surface of at least one of said fuel cell cassettes.

19. A seal joint for sealing together and insulating adjacent elements of a solid oxide fuel cell consisting of a metal braze layer and a separate ceramic layer applied directly to at least one of said adjacent elements.

20. A seal joint in accordance with claim 19 wherein alumina is not applied to said at least one of said adjacent elements prior to said ceramic layer being applied to said at least one of said adjacent elements.

\* \* \* \* \*